Oct. 3, 1944.  A. ALLEN ET AL  2,359,278
METHOD AND APPARATUS FOR DETERMINING THE
CONCENTRATION OF MOISTURE IN MATERIALS
Filed Feb. 12, 1941  4 Sheets-Sheet 1
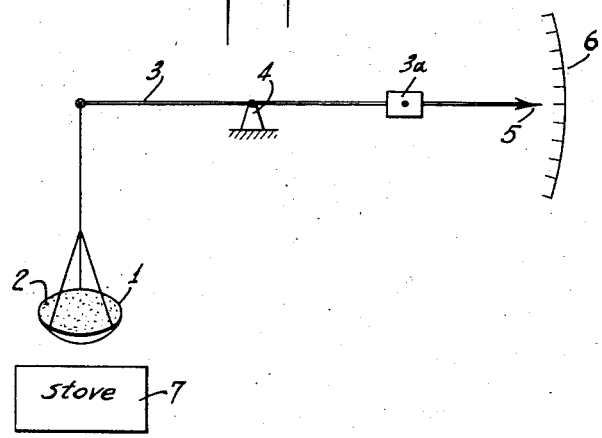
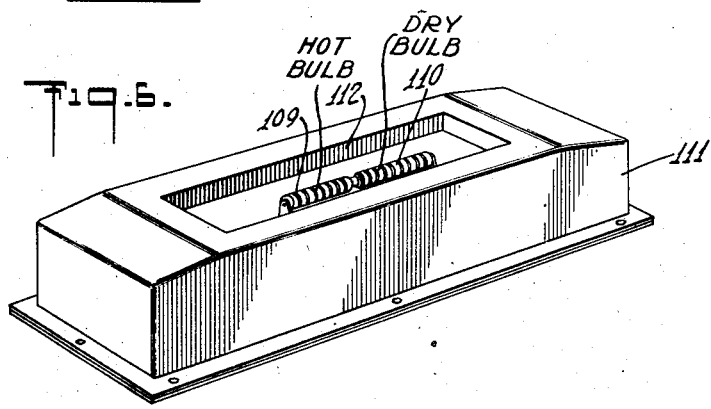
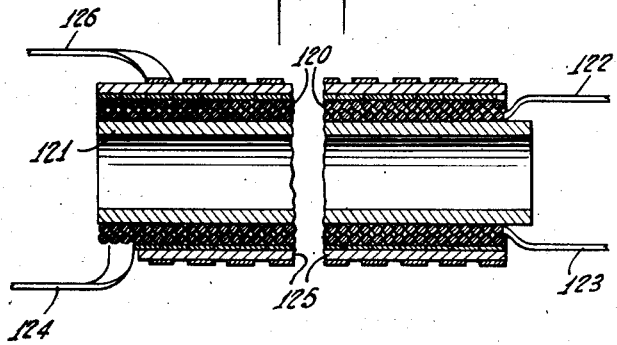
INVENTOR
ALBERT ALLEN
WILFRED H. HOWE.
BY
Blair, Curtis + Hayward
ATTORNEYS

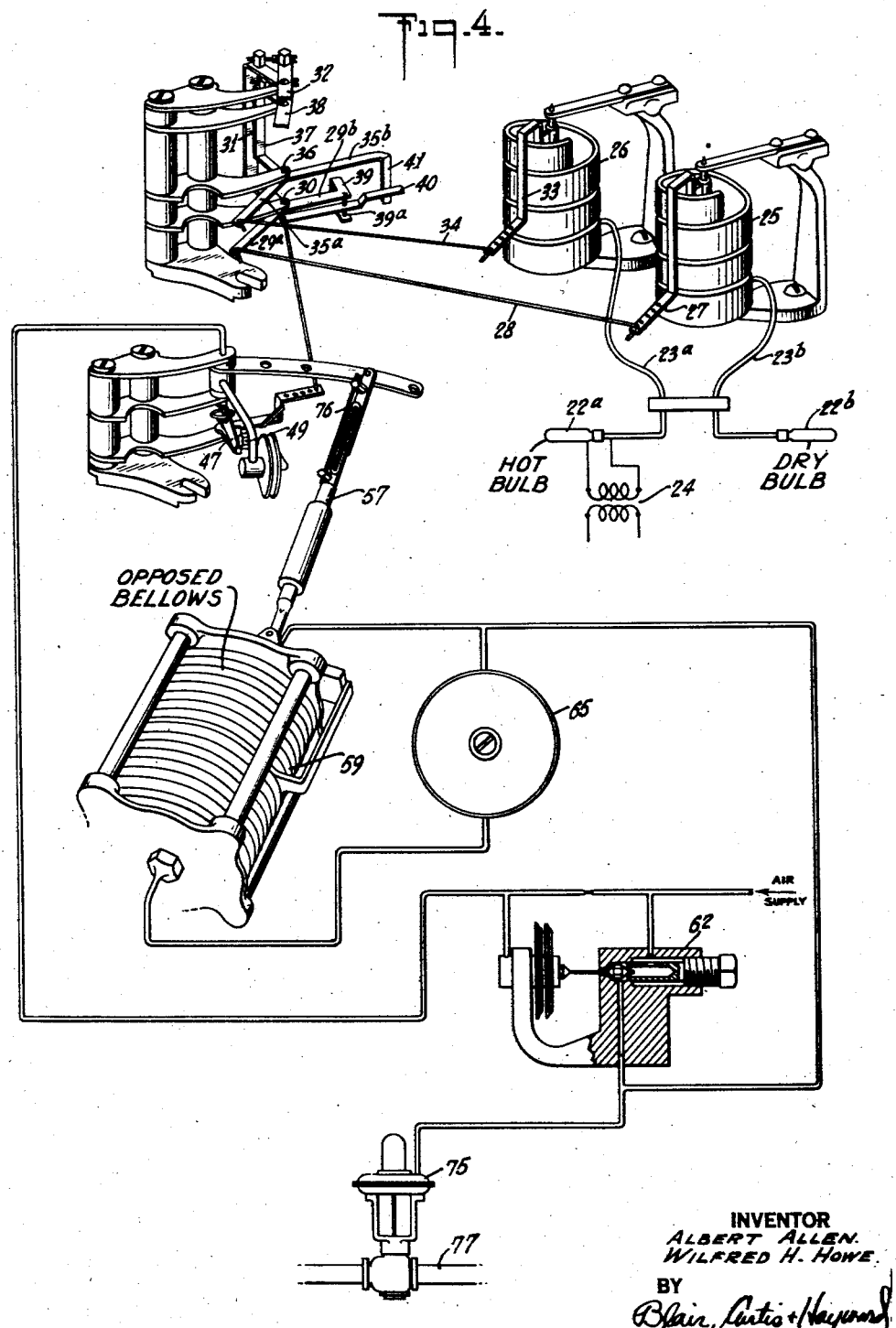

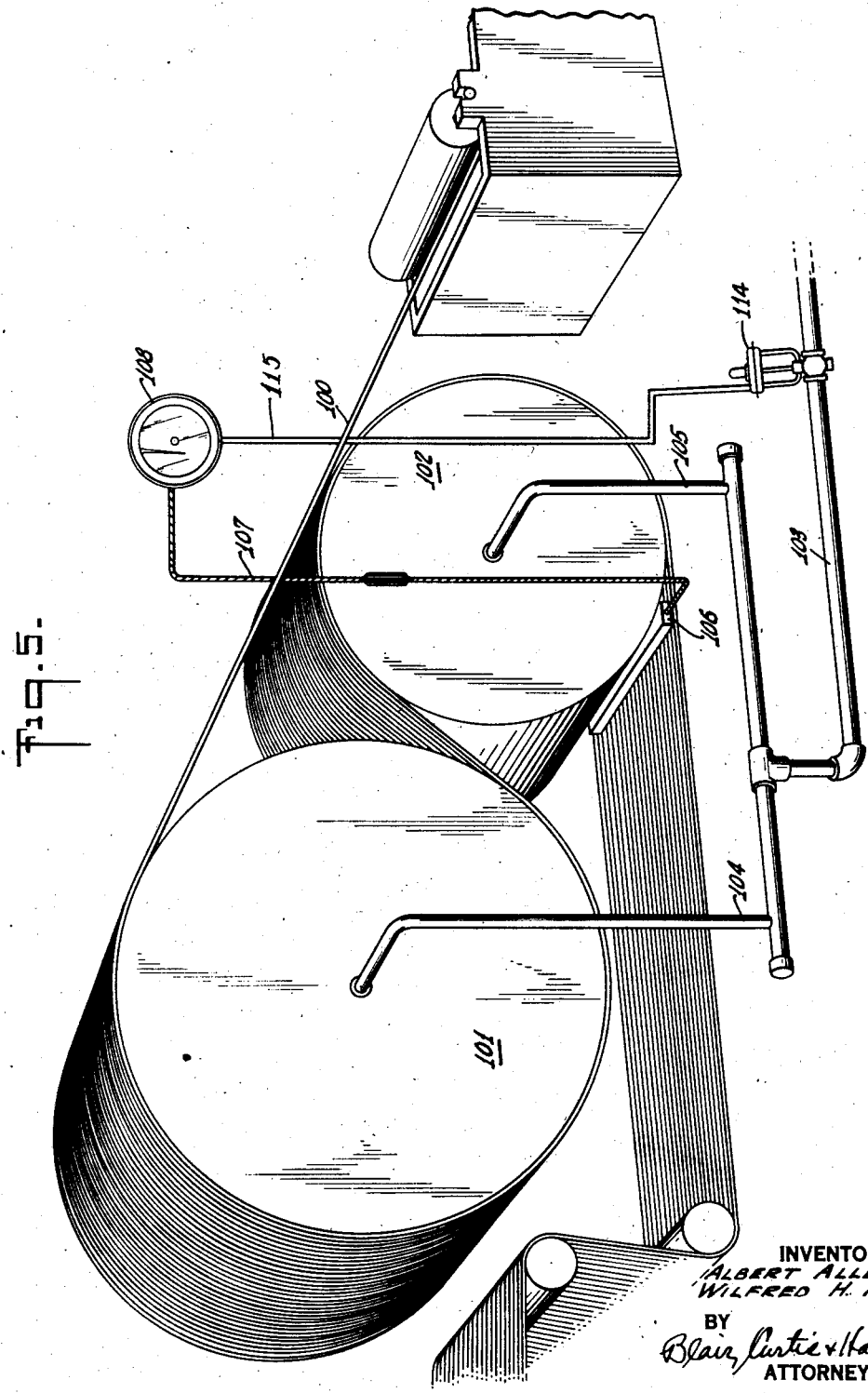

Patented Oct. 3, 1944

2,359,278

UNITED STATES PATENT OFFICE 2,359,278

METHOD AND APPARATUS FOR DETERMINING THE CONCENTRATION OF MOISTURE IN MATERIALS

Albert Allen and Wilfred H. Howe, Sharon, Mass., assignors to The Foxboro Company, Foxboro, Mass., a corporation of Massachusetts Application February 12, 1941, Serial No. 378,648

26 Claims. (Cl. 73—76)

This invention relates to a method and apparatus for measuring the vapor pressure exerted by a fluid, or the concentration of moisture in a material by utilizing pressure exerted by the vapor of the fluid, and more particularly to novel method and apparatus for measuring and indicating, or recording the vapor or gas pressure or quantity of a fluid such as water vapor, either in an atmosphere such as air or in solid or liquid materials.

It is an object of the present invention to provide a new and useful method and apparatus for carrying out such measurements and for utilizing such measurements for indicating, or recording purposes.

The many objects and advantages of the present invention may best be appreciated by referring to the accompanying drawings which illustrate several specific embodiments of the invention. In the drawings:

Figure 1 is a diagrammatic view of one embodiment of the invention in which a responsive element is heated by convection and radiation;

Figure 4 illustrates the invention as embodied in a controller;

Figure 5 illustrates the invention as applied to the problem of measuring the moisture content of a running web;

Figure 6 is a perspective of the hygrometer shoe of Figure 5 showing the arrangement of the responsive elements; and Figure 7 is an axial section through one of the elements of Figure 6.

Figure 2:
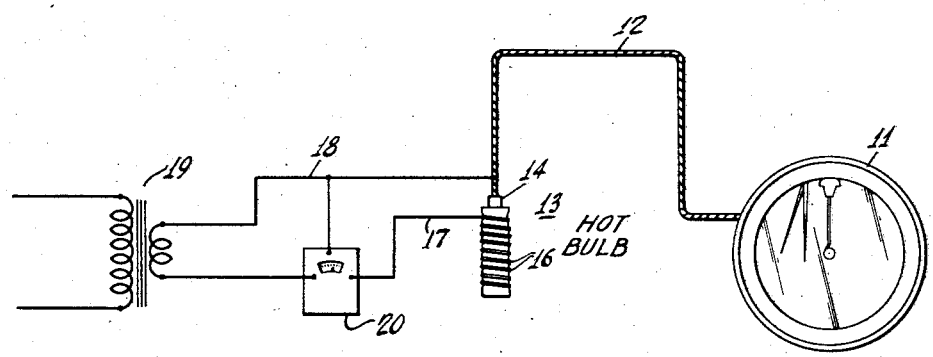
Figure 2 illustrates a second embodiment of the invention in which the responsive element is heated by electricity.

To aid the reader in understanding the method of the invention and the operation of the novel apparatus shown in the drawings, a brief discussion of the theory of operation is included at this point with special reference to Figure 1 which shows a relatively simple embodiment of the present invention as applied to the problem of measuring the moisture content of air under atmospheric conditions. It is a well known fact that under such conditions the air exerts a pressure, commonly called atmospheric pressure, on any object with which it is in contact and that if water vapor is present in the air a part of the atmospheric pressure is exerted by the water vapor content. This partial pressure of water vapor may be taken as a measure of the volume of water vapor in the air. For example, if the atmosphere contains 1% by volume of water vapor, the partial pressure exerted by the water vapor will be 1% of the total atmospheric pressure. The method here used to measure the moisture content of air consists generally in artificially producing a vapor pressure sufficient to balance the partial pressure of water vapor in the atmosphere and effectively measuring that artificially produced pressure by measuring the value of a condition which varies with changes in the value of the artificially produced pressure.

It is known that there are substances that have the characteristic of taking on the vapors of liquids and that the vapors have a tendency to escape again to the circumambient surroundings, and that this escaping tendency, which may be measured in terms of vapor pressure, increases with other physical conditions of the substance such, for example, as increasing temperature. Examples of such substances are certain salts such as lithium chloride and calcium chloride which are hygroscopic, that is, they have a tendency under certain conditions to take up water from the atmosphere. The water associated with the salt has a tendency to escape to the atmosphere again and this escaping tendency, which may be measured in terms of vapor pressure, increases with increasing temperature. When such a salt is heated, a temperature is eventually reached such that the escaping tendency of the water associated with the salt is just equal to the tendency of the salt to take on water from the atmosphere. In other words, the vapor pressure exerted by the water associated with the salt is equal to the partial pressure of water vapor in the atmosphere and an equilibrium condition exists such that the quantity of water taken up by the salt from the atmosphere is just equal to the quantity of water given up by the salt to the atmosphere. At this equilibrium point the temperature of the salt and the water associated therewith is a measure of the partial pressure of water vapor in the surrounding atmosphere.

Referring now to Figure 1 of the drawings, the numeral 1 indicates an open pan containing a quantity of lithium chloride 2. The pan 1 is supported at one end of a lever 3 which itself is freely pivoted about a fulcrum 4. At its other end lever 3 is provided with an indicating pointer 5 which cooperates with an index or scale 6. The pointer indicates on the scale the distance between the pan 1 and a suitable source of constant temperature heat such as the stove 7, and consequently the pointer effectively indicates the temperature of the salt. Lever 3 is provided as shown with a counterweight 3a to balance the weight of the pan 1 and salt thereon.

With the apparatus disclosed, the temperature of the salt 2 is automatically maintained at an equilibrium value such that the amount of water which the salt absorbs from the circumambient atmosphere is equal to the amount of water given up by the salt to the atmosphere. This automatic adjustment is accomplished in the following manner.

If the pan 1 is so located with respect to the heater 7 that the salt 2 is at its equilibrium temperature and an increase in the moisture content of the circumambient atmosphere occurs, the salt 2 will begin to take on water from the atmosphere. The resulting increase in the weight of the salt will cause the pan to move downwardly toward the heater thus increasing the temperature of the salt. The increase in temperature of the salt becomes sufficient to cause the salt to stop taking moisture from the atmosphere and to lose such moisture as is necessary to return the salt to its original weight (the weight at which it balances counterweight 3a) so that the pan may reach a position of balance with respect to the heater at such a point that a new equilibrium temperature is established corresponding to the new moisture condition of the atmosphere. With a decrease in atmospheric moisture content, the operations described above occur in a reverse sense. With the construction shown in Figure 1, the pointer 5 indicates the distance of the salt from the heater and since the temperature of the salt varies with its distance from the heater, the position of the pointer may also be taken as an indication of the temperature of the salt and hence, as described above, an indication of the moisture content of the circumambient atmosphere.

It may be observed that the weight of the salt does not of itself bear any necessary relation to the moisture content of the circumambient atmosphere. Weight merely exemplifies a condition or characteristic of the salt which may be conveniently used to control the heat supply to the salt in such manner as to maintain the equilibrium temperature referred to above.

Figure 3:
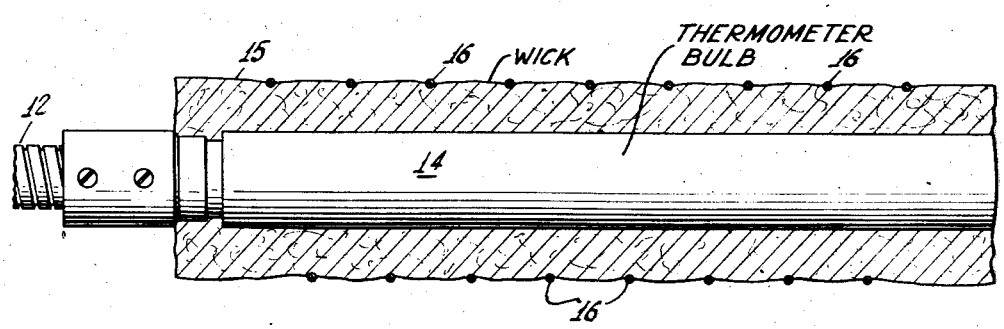
Figure 3 is an enlarged view partly in section of the responsive element of Figure 2.

In Figure 2 there is shown another method of obtaining and maintaining the equilibrium temperature referred to above wherein the heating is accomplished by supplying electrical energy directly to the sensitive element and wherein variations in electrical resistance rather than variations in weight are used to control the heat supply to maintain a salt at the equilibrium temperature. Referring to Figure 2, a conventional recording thermometer 11 is connected by a flexible cable 12 to a sensitive element generally indicated at 13. (The element 13 may be referred to as a "hot bulb.") As best shown in Figure 3, the element 13 comprises a temperature sensitive bulb 14 wrapped in a wick 15. This wick is treated with a saturated solution of lithium chloride to disperse the lithium chloride throughout the fibers of the wick, preferably in such a manner that in subsequent use some undissolved salt is always present on the wick. The wick thus treated will be referred to as a saline wick and as such when containing moisture has the property of conducting electricity, because of the electrolytic solution formed when the salt absorbs moisture. The conductivity of the saline wick is a function of the quantity of water associated with the salt thereon. Saline wick 15 may be advantageously heated by passing an electric current therethrough. A length of wire or narrow metallic strip 16 is helically wound around the exterior of the saline wick and is connected by the conductor 17 to one terminal of the secondary of a suitable transformer 19. The other terminal of the secondary of the transformer 19 is connected by conductor 18 to the flexible cable 12 near the temperature sensitive bulb 14, thus completing a circuit through bulb 14, saline wick 15, and wire helix 16. If desired, an electrical measuring instrument 20, such as a wattmeter, may be connected in the circuit as shown.

The transformer 19 is connected to a suitable source of 110-volt 60-cycle power. It is usually desirable to use alternating current to reduce the tendency of the salt solution on the saline wick to electrolyze and decompose. The wire 16 and bulb 14 may advantageously be constructed of silver which combines the properties of high electrical conductivity and effective resistance to the corrosive tendencies of the saline solution. The wick proper may be made of any suitable fibrous material such as cotton, asbestos, paper, and the like, and may be impregnated in any suitable manner. Satisfactory results have been obtained by dipping a cotton wick in a saturated lithium chloride solution at 100° F. and drying at 250° F.

The potential of the electrical energy supplied to the wick may be varied considerably but it is necessary to supply a certain minimum potential. This minimum potential will vary with the character of the saline wick used, but should be sufficient to raise the temperature of the saline wick to its operative range, that is, at least to the equilibrium temperature referred to above. With the apparatus above described good results have been obtained with a potential of 10 volts using .025″ diameter wire for wrapping the wick 15 and spacing the turns to give ten turns to the inch.

The operation of the device is as follows: As pointed out above, the electrical conductivity of the saline wick 15 is a function of the quantity of water associated with the lithium chloride on the wick. As the wetness of the saline wick increases, its conductivity increases also, and vice versa. As electrical energy ($I^2R$) is supplied to the element 13, its temperature will tend to rise and hence the vapor pressure exerted by the solution with which the saline wick is impregnated will also rise. When the temperature has risen to the point where the vapor pressure exerted by the water of the lithium chloride solution equals the partial pressure of water vapor in the circumambient atmosphere, the equilibrium condition referred to above is reached and thereafter the temperature will be automatically maintained at that point. If the temperature of the sensitive element 13 and lithium chloride solution is above the equilibrium temperature, the saline wick will give up water to the atmosphere and continue to dry out until its conductivity decreases to the point where the flow of heating current to the saline wick decreases to lower the temperature of the element to the equilibrium value. If, on the other hand, the temperature of the saline wick and solution drops below this equilibrium point, the lithium chloride will take up water from the atmosphere, the conductivity of the saline wick will increase, and hence the flow of heating current through the saline wick will increase to increase the temperature of the sensitive element. Thus the equilibrium temperature of the element 13 is automatically maintained at the desired value and may be used to measure the moisture content of the circumambient atmosphere.

The recording thermometer 11 may be calibrated to read directly in terms of moisture content, that is, to indicate the percent by volume of water vapor in the atmosphere. Under certain circumstances an indication of moisture content may be obtained by measuring the heat supplied to the responsive element 13 by measuring by means of the instrument 20 the quantity of electrical energy supplied to the saline wick 15 to heat it. However, in most cases it is desirable to measure the temperature of the saline wick directly by a recording thermometer as shown, or by a thermocouple or other temperature measuring device.

Under certain circumstances it may be desirable to know the moisture content of an atmosphere in terms of percent relative humidity rather than in terms of absolute humidity. By percent relative humidity is meant the ratio of the quantity of water actually present in the atmosphere to the quantity of water that would be present in the atmosphere if it were saturated at the ambient temperature, multiplied by one hundred. It can be mathematically shown that such a value for percent relative humidity can be obtained by suitably correlating the value of absolute humidity as represented by the temperature of the sensitive element 13 (Figure 2) and the value of the ambient temperature as measured by any suitable means. Whereas there are several such relationships that may be used, one that lends itself to commercial practice is that in which the difference between the temperature of the sensitive element 13 and the temperature of the circumambient atmosphere is utilized to indicate relative humidity. Such a temperature difference may be obtained with a relatively simple mechanical linkage system. Although the accuracy of the indication of relative humidity obtained in this way varies slightly with changes in ambient temperature, commercially satisfactory results may be obtained in many cases without compensation for changes in ambient temperature, especially where the variations in ambient temperature are relatively small. The indicating element of the recording thermometer may be made responsive to the difference between the temperature of the saline wick 15 and the temperature of the ambient atmosphere and the instrument may be calibrated to read directly in terms of relative humidity. Furthermore, either the temperature of the wick 15 or the temperature difference between the saline wick 15 and the atmosphere may be used as a control variable to control either the absolute humidity or the relative humidity of an atmosphere as will now be described.

Referring now to Figure 4 of the drawings and particularly the lower right-hand portion of Figure 4, there is shown a water supply pipe 77 which supplies water for humidifying a room or other space to be humidified in known manner. The pipe 77 is provided with a pneumatically operated control valve 75 and the rate of flow of water in pipe 77 is controlled by varying the air pressure supplied to the valve 75 in a manner now to be described.

Referring to the upper right portion of Figure 4, there are shown two temperature sensitive elements 22a and 22b which may be constructed like the element 13 of Figure 2 and which may be suitably located in the room or other space wherein the relative humidity is to be controlled. Element 22a like the element 13 is supplied with electrical energy from a suitable source such as a transformer 24 and is connected by a flexible cable 23a with a pressure responsive helix 26 which tends to unwind and wind up as the temperature of element 22a rises and falls. Element 22b, which measures ambient atmospheric temperature, receives no supply of electrical energy and is connected by flexible cable 23b with a pressure responsive helix 25 similar to the helix 26. (For convenience in distinguishing elements 22a and 22b, they may be referred to, respectively, as the "hot bulb" and "dry bulb.") Helix 25 through lever 27 and link 28 actuates a bell crank lever pivoted at 30 and comprising the arms 29a and 29b. Connected to, moving with, and supporting the bell crank 29a, 29b is an arbor 31 carrying a pen arm 32 which records the temperature measured by ambient temperature element 22b. The element 26 through lever 33 and link 34 moves a bell crank lever pivoted at 36 and comprising the arms 35a and 35b. Connected to, moving with, and supporting bell crank 35a, 35b is an arbor 37 carrying the pen arm 38 which records the temperature measured by the element 22a. The arm 29b of bell crank 29 is provided with a yoke 39 which holds a spindle 39a pivotally supporting a differential lever 40, one end of which is positioned by a tongue 41 extending from the arm 35b of bell crank lever 35a, 35b.

The other end of lever 40 may be used to operate control mechanism of any desired type and such operation would make the control mechanism responsive to the differential action of the two bulbs 22a and 22b. For purposes of illustration a controller such as disclosed in the Mason reissue Patent No. 20,092 may be used, in which event the differential lever would be connected to operate a baffle of the control couple disclosed in the Mason patent. Such control mechanism is diagrammatically shown in Figure 4 and comprises a pair of opposing bellows 59 for operating a nozzle 49 in conjunction with a baffle 47 operated by the lever 40. It also includes a relay valve 62 pneumatically operated by the output pressure of the nozzle and baffle to control the supply of air pressure to and from the opposing bellows 59. As disclosed in the Mason patent the opposing bellows are connected through a restriction 65. The operation of this control structure will not be described here since it forms no part of the present invention and is fully disclosed in the Mason patent. It is deemed sufficient to point out that through the operation of the control mechanism the pneumatically operated valve 75 controls the water supply to the humidifying apparatus so as to maintain substantially constant the temperature difference between the two bulbs 22a and 22b.

The desired value of relative humidity (the control point) may be varied by adjusting the neutral position of nozzle 49. This adjustment may be made by rotating micrometer screw 76 to alter the length of link 57 connecting the bellows 59 and the nozzle 49.

Figure 5 shows an embodiment of the invention wherein apparatus functionally similar to that of Figure 2 is used to measure the moisture content of a solid, i. e., a running textile web. Referring to Figure 5 there is shown a conventional cotton slasher wherein a cotton warp 100 passes over steam heated drying rolls 101 and 102 which are heated by steam passing through a steam line 103 and branch lines 104 and 105. Near the point where the cotton warp 100 leaves the roll 102 and between the warp and roll 102, there is a hygrometer shoe 106 which bears lightly against the warp and which is connected by a flexible cable 107 to a recording instrument 108. The shoe 106 is shown more in detail in Figure 6 and comprises a rectangular metal shell 111 forming a compartment 112 which is enclosed on all sides except the side which is exposed to the warp 100. Compartment 112 contains the responsive elements 109 (hot bulb) and 110 (dry bulb) which, in this embodiment, are shown as using electrical resistance thermometers for temperature measurement. The elements 109 and 110 may be similarly constructed and may be made as shown in Figure 7.

Referring to Figure 7 which shows a section through one of the elements, a double layer 120 of insulated nickel resistance wire is wound on a hollow wooden core 121, the resistance wire leads being designated as 122 and 123. A silver strip 124 is then wound around the outside of the resistance wire in a tight helix as shown. The silver strip helix 124 is covered with a layer of paper 125 which is about .004" thick and which is impregnated with a saturated lithium chloride solution. Finally a second silver strip 126 is wound around the outside of the unit to form an open helix. The element 109 is supplied through conductors 124 and 126 with electrical heating energy whereas the element 110, although similarly constructed, receives no supply of heating energy.

Referring again to Figure 5, the flexible cable 107 carries six conductors connecting the shoe 106 with the instrument 108. One pair of conductors supplies heating energy to the leads 124 and 126, and one pair of conductors is connected to the resistance elements of each of elements 109 and 110. The instrument 108 is supplied with electric power from a suitable source (not shown) and is of a type suitable for recording the difference in temperature between the electrical resistances of elements 109 and 110. Such apparatus is well known in the art and will not be described in detail here. The resistances may, for example, be connected in two arms of an electrical bridge circuit in such a manner that a galvanometer connected across the bridge circuit indicates the temperature difference between the elements. The apparatus may be of the general type disclosed in Quereau Patent No. 2,102,030.

The operation of the shoe 106 and its associated elements is as follows: In drying fibrous materials of a given type, the moisture contained in the fibers at their existing temperature develops a definite water vapor pressure characteristic of that temperature and moisture content. Since the warp 100 continuously moves past the open face of compartment 112, the space within the compartment will quickly reach a condition of temperature and water vapor pressure the same as that of the warp. The shoe 106 is preferably constructed so that by contacting the warp the temperature of the shoe as a whole will be nearly that of the warp, and the temperature difference between the warp and compartment 112 will be a minimum.

The element 109, like the element 13 of Figure 2, is supplied with electrical heating energy and hence its temperature will rise to a point where the vapor pressure of the water in the saline solution with which the paper 125 is impregnated just equals the pressure of water vapor in the surrounding atmosphere, and hence the vapor pressure of the water contained in the warp passing the shoe 106. The element 110, since it has no electrical heating connection, will assume the temperature of its surroundings and hence have the same temperature as the warp.

As pointed out above, there is a definite relationship between the moisture content of a warp of given material, its temperature, and the water vapor pressure which it exerts. This relationship can be determined and the actual moisture content of the material may be determined by properly correlating measured values of its temperature and water vapor pressure. In the present embodiment, the difference between a temperature corresponding to the water vapor pressure of the warp (temperature of the element 109) and the temperature of the warp (temperature of the element 110) is used as a measure of the moisture content of the warp. We have found that the temperature difference between the elements 109 and 110 is a reasonably accurate measure of moisture content of warp material within the usual working range with limited temperature variations. For wider temperature variations the general relationship holds, but correction must be applied both for the amount of temperature variation and the rate of change of temperature for given moisture changes, the amount of the correction depending upon the deviation of the temperature. Furthermore, the temperature in the compartment 112 is slightly lower than that of the warp although, as stated above, the shoe 106 is so constructed as to minimize this difference. However, this latter temperature difference is roughly constant and hence enters as a constant correction in the calibration. The instrument 108 may, if desired, be calibrated to read directly in terms of warp moisture content.

It will be understood that the instrument 108 may also be a controller and the moisture content of the warp may be controlled by controlling the flow of steam to heat the rolls 101 and 102. In such a case a pneumatically operated control valve 114 may be inserted in the pipe 103 and the valve 114 may be connected by a pipe 115 with the instrument 108 in known manner.

As pointed out above, the foregoing description is of specific embodiments of the present invention. The scope of possible application of the present invention is so wide and the number of possible equivalent elements that might be substituted for the elements described above so great that it would clearly be impracticable to include an exhaustive list in this specification. However, it seems desirable at this point to indicate a few of the other fields of application of the present invention and some of the elements which might be substituted for those illustratively shown in the drawings. It is first of all apparent that the present invention may be used not only as illustratively shown and described herein to measure the water vapor content or relative humidity of an air atmosphere, but also to measure the moisture content of other mixed vapor atmospheres or to measure the proportion of constituents other than water vapor present in a vapor atmosphere, or to measure the pressure of a vapor or gas which is the sole component of an atmosphere. It may also be used to measure the fluid concentration in a solid material as disclosed, as well as the fluid concentration in a liquid material.

The wick 15 and associated saline solution may be broadly described as a medium having a preferential affinity for a vapor or gas present in an atmosphere, and it is apparent that if the invention is applied to the measurement of constituents other than water vapor, media having an appropriate affinity for the measured component will be used. These media are characterized by the fact that the affinity of the measured constituent for the medium is essentially a function of temperature and a characteristic of the medium capable of influencing flow of heat energy thereto is a function of the quantity of the measured constituent associated with the medium.

Furthermore, the method of the present invention presents numerous advantages over preexisting methods of measuring one constituent of a mixed atmosphere. For example, one method of measuring the humidity of an atmosphere is by the use of a so-called wet and dry bulb thermometer. The accuracy of such a device depends in large measure upon adequate circulation of air or other atmosphere past a moisture responsive element. With a device such as that of Figure 4, accuracy of measurement is substantially independent of the rate of circulation past the responsive element, and accurate measurements may be obtained with only enough circulation past the responsive element to insure that the atmosphere in contact with the element is a representative sample of the whole. With a wet and dry bulb thermometer, a continuous supply of water of high purity is required, whereas the apparatus of the present invention operates without any addition of water. It requires only a convenient source of heating energy, and the power requirements are small. Moreover as a humidity measuring device, the device of the present invention may be operated at relatively low ambient temperatures because the freezing point of a saturated lithium chloride solution is substantially below that of water.

The heating of the responsive element may be done by electricity or by a stove as disclosed, or steam or other suitable heating media may be used. The heating may be direct or indirect, that is, the heating may be accomplished as in Figure 2 by passing an electric current directly through the element, or the heating may be indirect as in Figure 1.

We claim:

1. The method of measuring the partial pressure or quantity of moisture present in an atmosphere, comprising the steps of supplying electrical energy to a medium having a preferential affinity for said moisture which is a discontinuous function of temperature and having an electrical characteristic capable of influencing flow of electrical energy in said medium which is a function of the quantity of said moisture associated with said medium to cause a current to flow in said medium to heat said medium to a critical equilibrium temperature corresponding with the quantity of said moisture in said atmosphere and measuring the temperature of said medium as an indication of the partial pressure or quantity of said moisture present in said atmosphere.

2. The method of measuring the humidity of an atmosphere which comprises the steps of supplying electrical energy to a wick impregnated with a saturated saline solution to heat the same to an equilibrium temperature corresponding with the humidity of said atmosphere, exposing said wick to said atmosphere, and measuring the temperature of said wick as an indication of the humidity of said atmosphere.

3. The method of measuring the relative humidity of an atmosphere which comprises supplying electrical energy to a wick impregnated with a saturated saline solution to heat the same to its equilibrium temperature, measuring said equilibrium temperature of said wick, measuring the temperature of the atmosphere, and subtracting said atmospheric temperature from said wick temperature to obtain a value indicative of the relative humidity of said atmosphere.

4. In apparatus for measuring the quantity of moisture present in an atmosphere, the combination of a medium having a preferential affinity for said moisture which is a discontinuous function of temperature and having an electrical characteristic capable of influencing flow of electrical energy in said medium which is a function of the quantity of said moisture associated with said medium, means for supplying electrical energy to said medium to cause a current to flow therein to heat said medium to a critical equilibrium temperature corresponding with the quantity of said moisture present in said atmosphere, and means responsive to the temperature of said medium to indicate the quantity of said moisture present in said atmosphere.

5. Apparatus for measuring the proportion of condensible vapor present in an atmosphere, comprising, in combination, a porous medium exposed to said atmosphere and wetted with a saturated saline solution of the condensate of said condensible vapor, means for supplying electrical energy to said medium to cause a current to flow therein to heat said medium to an equilibrium temperature corresponding with the proportion of said condensible vapor in said atmosphere, and means for indicating the condensible vapor content of said atmosphere including an element responsive to the temperature of said medium.

6. Apparatus for measuring the humidity of an atmosphere, comprising, in combination, a wick wetted with a saturated solution of lithium chloride and exposed to said atmosphere, means for supplying electrical energy to said wick to heat the same to an equilibrium temperature corresponding with the humidity of said atmosphere, and means responsive to the temperature of said wick for indicating the humidity of said atmosphere.

7. In apparatus for measuring the humidity of an atmosphere, in combination, an electrical circuit including a source of electrical energy, a saline wick, and a pair of conductors connecting said source of energy with said wick whereby said wick is heated to and maintained at a critical equilibrium temperature corresponding with the humidity of said atmosphere, and means responsive to the temperature of said wick for indicating the humidity of said atmosphere.

8. In apparatus responsive to the humidity of an atmosphere, in combination, a humidity responsive element comprising a thermometer bulb, a saline wick substantially surrounding said bulb, and a conductor in contact with the exterior surface of said wick, means for causing an electric current to flow from said conductor through said wick to said bulb to heat said wick, and means connected to said bulb for actuation in accordance with the humidity of said atmosphere.

9. The method of measuring the partial pressure or quantity of water vapor present in an atmosphere comprising the steps of supplying heating energy to a medium having a preferential affinity for said water vapor up to but not above a critical equilibrium temperature corresponding with the quantity of water vapor present in said atmosphere and having a characteristic capable of influencing flow of heating energy to said medium which is a function of the quantity of water associated with said medium, the quantity of heating energy supplied to said medium being sufficient to heat it to said equilibrium temperature, and effectively measuring the temperature of said medium as an indication of the partial pressure or quantity of said water vapor present in said atmosphere.

10. The method of measuring the amount of moisture in a moist material which comprises exposing to said moist material a medium capable of continuously taking up or giving off said moisture depending, respectively, upon whether the temperature of said medium is below or above an equilibrium temperature corresponding to the amount of moisture in said material, said medium having a characteristic which is a continuous function of the amount of said moisture held by said medium, supplying heating energy to said medium in accordance with the value of said characteristic to maintain said medium of said equilibrium temperature, and effectively determining the value of said equilibrium temperature as a measure of the amount of said moisture in said material.

11. In apparatus for measuring the amount of moisture in a moist material, the combination of a medium capable of taking on and giving off said moisture depending on whether the temperature of the medium is, respectively, below or above an equilibrium value corresponding with the concentration of said moisture in said material, said medium having a characteristic which is a continuous function of the amount of said moisture held by said medium, means for supplying heating energy to said medium in accordance with the value of said characteristic to maintain said medium at said equilibrium temperature, means for measuring the equilibrium temperature of said medium, and means responsive to the value of said equilibrium temperature for indicating the amount of said moisture in said material.

12. The method of measuring the concentration of water vapor in an atmosphere which comprises exposing to said atmosphere a saline medium comprising a wick impregnated with a saturated salt solution capable of taking up water from said atmosphere or giving up water to said atmosphere according to whether the temperature of said wick is, respectively, below or above an equilibrium temperature corresponding to the concentration of water vapor in said atmosphere, said saline medium having an electrical conductivity which varies with the amount of water held by said saline medium, supplying electrical energy to said saline medium, the flow of energy being controlled by the said variable conductivity of said saline medium whereby said saline medium is maintained at said equilibrium temperature, and effectively determining the value of said equilibrium temperature as a measure of the concentration of water vapor in said atmosphere.

13. The method of measuring the moisture content of a solid material which comprises the steps of establishing a moisture exchanging relationship between said solid and a medium capable of taking up or giving off said moisture depending respectively upon whether the temperature of said medium is below or above an equilibrium temperature corresponding to the concentration of said moisture in said material, said medium having a characteristic which is a function of the amount of said moisture held by said medium, supplying heating energy to said medium in response to the value of said characteristic to maintain said medium at said equilibrium temperature, and effectively determining the value of said equilibrium temperature as a measure of the moisture content of said material.

14. The method of measuring the moisture content of a running fibrous web which comprises continuously exposing to said web within a confined space adjacent said web a saline medium capable of taking up water from said web or giving up water to said web according to whether the temperature of said medium is respectively below or above an equilibrium temperature corresponding to the concentration of water in said web, supplying electrical energy to said saline medium to heat it to said equilibrium temperature, effectively measuring said equilibrium temperature, measuring the ambient temperature in said confined space, and determining the difference between said equilibrium temperature and said ambient temperature as a measure of the moisture content of said web.

15. The method of measuring the concentration of moisture in a moist material which comprises exposing to said moist material a quantity of a medium capable of taking on or giving off said moisture depending respectively upon whether the temperature of said medium is below or above an equilibrium temperature corresponding to the concentration of said moisture in said material, supplying heat energy to said medium to heat it to said equilibrium temperature, varying the quantity of heat energy supplied in response to variations in the weight of said quantity of medium and the moisture associated therewith, and effectively determining the value of said equilibrium temperature as a measure of the concentration of said moisture in said material.

16. The method of measuring the concentration of water in a material which comprises exposing to said material a medium capable of continuously taking up or giving off water depending respectively upon whether the temperature of said medium is below or above an equilibrium temperature corresponding to the concentration of water in said material, said medium having an electrical characteristic which is a function of the amount of water held by said medium, supplying heating energy to said medium in accordance with the value of said electrical characteristic to heat said medium to and maintain said medium at said equilibrium temperature and effectively determining the value of said equilibrium temperature as a measure of the concentration of water in said material.

17. The method of measuring the concentration of water in a material which comprises exposing to said material a medium capable of taking up or giving off water depending respectively upon whether the temperature of said medium is below or above an equilibrium temperature corresponding to the concentration of water in said material, said medium having an electrical resistance which varies with the amount of water held by said medium, supplying electrical energy directly to said medium to maintain said medium at said equilibrium temperature, and effectively determining the value of said equilibrium temperature as a measure of the concentration of water in said material.

18. The method of measuring the concentration of water in a material which comprises exposing to said material a medium capable of taking up or giving off water depending respectively upon whether the temperature of said medium is below or above an equilibrium temperature corresponding to the concentration of water in said material, said medium having a characteristic which is a function of the amount of water held by said medium, supplying heating energy indirectly to said medium under the control of the value of said characteristic to maintain said medium at said equilibrium temperature, and effectively determining the value of said equilibrium temperature as a measure of the concentration of water in said material.

19. The method of measuring the moisture content of a material which comprises exposing to said material a quantity of a medium capable of taking up or giving off moisture depending respectively upon whether the temperature of said medium is below or above an equilibrium temperature corresponding to the concentration of moisture in said material, the weight of said quantity of medium being a function of the amount of moisture held by said medium, supplying heat energy to said medium in response to variations in the weight of said quantity of medium and the moisture associated therewith to maintain said medium at said equilibrium temperature, and effectively determining the value of said equilibrium temperature as a measure of the moisture content of said material.

20. In apparatus for measuring the water content of a material by measuring the concentration of water vapor in a confined space in moisture equilibrium with said material, comprising, in combination, a medium capable of taking up or giving off said fluid depending respectively upon whether the temperature of said medium is below or above an equilibrium temperature corresponding to the water content of said material, said medium having an electrical characteristic which is a function of the amount of water held by said medium, means for supplying electrical energy directly to said medium to heat said medium to and maintain it at said equilibrium temperature, and means responsive to the equilibrium temperature of said medium for indicating the concentration of water in said material.

21. The method of measuring the moisture content of a solid material by measuring the concentration of moisture in a confined atmosphere in equilibrium with said moisture-containing solid material which comprises the steps of exposing to said atmosphere a medium capable of taking up or giving off moisture depending respectively upon whether the temperature of said medium is below or above an equilibrium temperature corresponding to the concentration of moisture in said material, said medium having a characteristic which is a continuous function of the amount of moisture held by said medium, supplying heat energy to said medium in response to the value of said characteristic to maintain said medium at said equilibrium temperature, measuring the ambient temperature of said confined atmosphere, measuring said equilibrium temperature and effectively determining the difference between the value of said equilibrium temperature and the value of said ambient temperature as a measure of the concentration of moisture in said solid material.

22. The method of measuring the water content of a material by measuring the concentration of water vapor in a confined atmosphere in vapor equilibrium with said material which comprises exposing to said atmosphere a medium capable of taking up or giving off water depending respectively upon whether the temperature of said medium is below or above an equilibrium temperature corresponding to the concentration of water in said atmosphere, said medium having a characteristic which is a continuous function of the amount of water held by said medium, supplying heat energy to said medium in response to the value of said characteristic to maintain said medium at said equilibrium temperature, effectively determining the value of said equilibrium temperature, measuring the ambient temperature of said confined atmosphere, and determining the difference between said equilibrium temperature and said ambient temperature as a measure of the concentration of water in said material.

23. The method of measuring the relative humidity of an atmosphere which comprises exposing to said atmosphere a medium capable of taking up or giving off water continuously depending respectively upon whether the temperature of said medium is below or above an equilibrium temperature corresponding to the concentration of water vapor in said atmosphere, said medium having a characteristic which is a continuous function of the amount of water held by said medium, supplying heating energy to said medium in response to the value of said characteristic to maintain said medium at said equilibrium temperature, effectively determining the value of said equilibrium temperature, measuring the ambient temperature of said atmosphere, and correlating the value of said equilibrium temperature and the value of said ambient temperature to obtain an indication of the relative humidity of said atmosphere.

24. The method of measuring the moisture content of a running fibrous web which comprises continuously exposing to said web within a confined space adjacent said web a saline medium capable of continuously taking up water from said web or giving up water to said web according to whether the temperature of said medium is respectively below or above an equilibrium temperature corresponding to the concentration of water in said web, supplying electrical energy to said saline medium to heat it to said equilibrium temperature effectively measuring said equilibrium temperature, measuring the ambient temperature in said confined space, and correlating said equilibrium temperature and said ambient temperature to obtain a value indicative of the moisture content of said web.

25. In apparatus for measuring the moisture content of a running web, in combination, a chamber having an opening, means for continually causing said web to pass said opening, a saline medium in said chamber capable of taking on water from said web or giving up water to said web, depending respectively upon whether the temperature of said medium is below or above an equilibrium temperature corresponding to the moisture concentration of said web, means for supplying heat energy to said saline medium to heat said medium to said equilibrium temperature, means for measuring the temperature of said saline medium, means for measuring the ambient temperature in said chamber, and means for correlating the value of said ambient temperature and the value of said equilibrium temperature to obtain a value indicative of the moisture content of said web.

26. The method of measuring the amount of moisture present in an atmosphere comprising the steps of supplying electrical energy to a medium having an affinity for said moisture which, at an equilibrium temperature corresponding with the amount of moisture in said atmosphere, changes a relatively large amount for a relatively slight change in temperature, said medium also having an electrical characteristic capable of influencing flow of electrical energy in said medium, which is a function of the quantity of said moisture associated with said medium, and the quantity of electrical energy supplied to said medium being sufficient to heat said medium to said equilibrium temperature, and measuring the temperature of said medium as an indication of the amount of moisture present in said atmosphere.

ALBERT ALLEN.
WILFRED H. HOWE.